April 26, 1960 R. L. HOTCHKISS ET AL 2,934,406
FOAM INHIBITION
Filed March 5, 1958
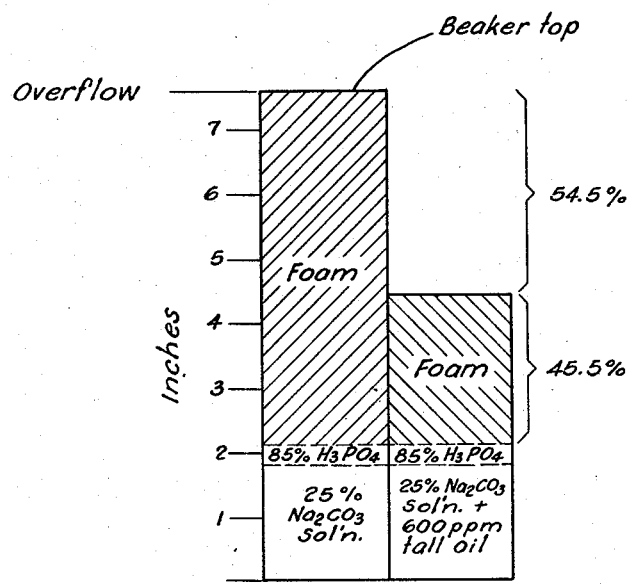
INVENTORS.
Robert L. Hotchkiss
Herman S. Gilbert
George R. Jungerman
BY Griswold & Burdick
ATTORNEYS

# United States Patent Office 2,934,406
Patented Apr. 26, 1960

2,934,406
FOAM INHIBITION

Robert L. Hotchkiss, Herman S. Gilbert, and George R. Jungerman, Lake Jackson, Tex., assignors to The Dow Chemical Company, Midland, Mich., a corporation of Delaware Application March 5, 1958, Serial No. 719,281

2 Claims. (Cl. 23—107)

The invention relates to inhibiting or diminishing foam formation. It more particularly relates to inhibiting foam formed when soda ash is reacted with a mineral acid.

In reactions involving a mineral acid and soda ash, e.g., in the preparation of a sodium phosphate as by reacting soda ash with phosphoric acid, excessive foaming which accompanies the reaction has presented a serious problem. The excessive foaming which occurs in present practice greatly reduces the available reactor space and further delays the progress of the reaction and the removal of the resulting phosphate. As much as one third of the available reactor space is taken up by the objectionable foam according to present practice.

Therefore, a desideratum exists in processes involving reactions between soda ash and a mineral acid for an inhibitor of the formation of foam during the reaction period.

Accordingly, the principal object of the invention is to provide a method of inhibiting foam formation which accompanies the reaction between soda ash and mineral acid. A particular object is to provide a method of producing monobasic and dibasic sodium phosphates by reacting phosphoric acid with soda ash which is characterized by the addition of a defoamer which results in a marked reduction in foam formed during the reaction.

These and related objects are attained according to the invention by admixing a defoamer consisting of tall oil either with the substantially dry soda ash prior to the reaction with a mineral acid or during said reaction.

The drawing shows graphically the depressive effect of the method of the invention on foam formation.

Tall oil is a viscous liquid comprising a mixture of fatty acids and rosin acids together with nonacidic substances which is obtained by acidifying the black liquor skimmings produced in the sulfate (kraft) process of wood pulp manufacture using rosinous wood such as pine. The fatty acids include a major proportion of linoleic and oleic acids and somewhat smaller amounts of adipic and sebacic acids. The rosin acids are abietic and pimaric type acids. The nonacidic portions are largely hydrocarbons and alcohol, e.g., β-sitosterol.

Crude tall oil may contain from 18 to 60 percent fatty acids, from 28 to 65 percent rosin acids, and from 5 to 24 percent nonacid substances. However, the crude tall oil of commerce usually contains from 46 to 52 percent fatty acids, from 40 to 45 percent rosin acids, and from 6.5 to 8 percent unsaponifiables. Refined or purified tall oil is preferred in the practice of the invention. Refined tall oil falls within the following specifications:

| Color (Gardner) | Acid Number | Saponification Number | Iodine Number | Percent Fatty Acid | Percent Rosin Acid | Percent Unsaponifiables |
|---|---|---|---|---|---|---|
| 9–14 | 155–183 | 158–185 | 143–210 | 37–52 | 32–66 | 4–12 |

Examples of commercially available refined tall oils are: Unitol, Facoil, Liquo, Rosoil, Indusoil, Acintol, and Pamak.

The mechanism of foam formation is associated with the formation of gas bubbles separated by liquid skins or laminae which constitute a sort of union by coherence at points of tangency with other bubbles in contact with them. There is not complete understanding of all physical factors contributing to the mechanism of foam formation but surface tension and vapor pressure of the liquid are important factors which, in turn, vary with the inherent characteristics of the liquid and with the temperature and the pressure at any given time.

Neither is the phenomenon of foam inhibition or suppression fully understood. The degree of suppression desired, the temperature, pressure, and degree of agitation of the soda ash and mineral acid affect the amount of defoamer to employ according to the invention.

The ratio of the weight of tall oil to the weight of soda ash useful in the practice of the invention is small. Ten parts of tall oil per million (p.p.m.) of the dry soda ash are effective in reducing foam. As much as 800 p.p.m. can be used but not over 600 p.p.m. are recommended. The tall oil may be admixed with the soda ash at any convenient time: it may be added to the dry soda ash even though the soda ash is thereafter to be placed in storage prior to reacting it with the acid; an aqueous solution or slurry of the soda ash may be prepared and the tall oil added thereto prior to reacting it with the acid; or the tall oil may be added to the reactants during the reaction. Although dilute acid, e.g., phosphoric in the production of sodium acid phosphates, may be added to dry soda ash, preferred practice is to prepare an aqueous solution or slurry of the soda ash prior to reacting it with more concentrated acid. The most convenient mode of practicing the invention is to admix the tall oil either with the dry soda ash or with the aqueous slurry prior to adding the acid thereto.

When such mode is practiced, substantial homogeneity of the tall oil and the dry soda ash or soda ash slurry should be achieved by adequate mixing. To demonstrate the effectiveness of the method of suppressing foam according to the invention in the preparation of sodium phosphates, a series of tests was run following the procedure set out below. The equations representing the reactions are:

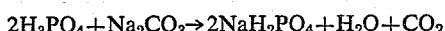
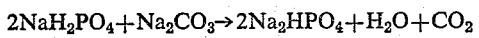

An apparatus, comprising a 2-liter beaker, into which a 1-liter separatory funnel was positioned to feed phosphoric acid into the beaker, and a motor-driven centrifugal type glass agitator (Sargent Catalog Number S-76685), was assembled. A 25 percent by weight aqueous solution of a commercial grade soda ash designated herein as "A" was prepared. 455 milliliters of this solution at 37° C. were placed in the 2-liter beaker. 170 milliliters of 85 percent by weight phosphoric acid were placed in the separatory funnel with the stopcock closed. These amounts of reactants provided an excess of $H_3PO_4$ over the $Na_2CO_3$ required by the above equations. The initial level of the soda ash solution in the beaker was 1⅝ inches measured from the bottom of the beaker. For comparative purposes, no defoamer was added to the beaker. The agitator was started, the stopcock of the funnel opened, and the phosphoric acid allowed to run down the inside wall of the beaker into the soda ash solution. The volume of phosphoric acid so added plus the volume of the soda ash solution would have filled the beaker to a depth of about 2¼ inches if no foaming had occurred. Excessive foaming occurred. This procedure represented conventional practice. Foam heights were measured and marked on the side of the beaker at 2-second time intervals until the foaming had ceased which was not until all the acid had been allowed to run into the beaker. The results are set out under "Soda ash untreated" in the table below.

Two more runs were made similarly, employing samples of two other grades of commercial soda ash designated herein "B" and "C," respectively. The results are set out along with those of the grade "A" sample for comparative purposes in the table under "Soda ash untreated."

A fourth run was made in a similar manner to the other three using grade A soda ash except that from 1 to 2 drops, approximately 600 p.p.m. calculated on the weight of the soda ash, of a refined tall oil known as Unitol S was admixed with the "A" soda ash solution in the beaker prior to admitting the phosphoric acid. The results are set out as examples of the invention in the table under "Soda ash treated according to the invention."

*Table*

[Height in inches from bottom of beaker to top of foam.]

| Time in Seconds | Soda Ash Untreated | | | Soda Ash Treated According to the Invention |
|---|---|---|---|---|
| | Grade of Soda Ash Used | | | |
| | A | B | C | A |
| 0 | 1⅝ | 1⅝ | 1⅝ | 1⅝ |
| 2 | 3 | 3⅛ | 3½ | 2⅝ |
| 4 | 3⅞ | 4¾ | 4¼ | 3⅛ |
| 6 | 4½ | 6 | 5 | 3⅝ |
| 8 | 5⅞ | 7⅛ | 6 | 3⅝ |
| 10 | 6⅞ | ¹O.F | 6¼ | 4⅛ |
| 12 | O.F | O.F | O.F | 4½ |
| 14 | O.F | O.F | O.F | 4 15/16 |
| 16 | O.F | O.F | O.F | 4⅞ |
| 18 | O.F | O.F | O.F | 5 |
| 20 | O.F | 7 | 6½ | 4⅛ |
| 22 | 5½ | 4⅞ | 5 | 3⅜ |
| 24 | 3½ | 3½ | 3½ | 2⅝ |
| 26 | 2¾ | 2½ | 2½ | 2 1/16 |

¹ O.F means foam overflowed beaker.

The drawing portrays the height of foam produced when 85 percent phosphoric acid was reacted with untreated soda ash in contrast to that produced when the same strength phosphoric acid was reacted with soda ash treated according to the invention. On the left side of the diagram is shown the height to which foam rose to the point of overflow when untreated soda ash was employed. On the right hand side is shown the height to which foam rose when soda ash which was treated according to the invention was used. Considering the foam height measured from the height of the $Na_2CO_3$ solution plus the $H_3PO_4$ if unfoamed to the beaker top as 100 percent, the drawing shows that the foam rose less than half or specifically 45.5 percent of the height to which the foam rose after 10–12 seconds when untreated $Na_2CO_3$ was used.

An examination of the examples above shows that the practice of the invention provides a method of reacting a mineral acid with soda ash which results in a reduction in the foam produced to an amount which is less than half of that produced when the soda ash is untreated. Soda ash (commercial $Na_2CO_3$) is produced in large volumes and is used in the manufacture of a large number of industrial products requiring its reaction with a mineral acid. The practice of the invention assures a saving in reactor space and time consumed in reactions of mineral acids with soda ash which is clearly extensive.

Having described the invention, what is claimed and desired to be protected by Letters Patent is:

1. The method of producing $NaH_2PO_4$ and $Na_2HPO_4$ by the reaction of $H_3PO_4$ with an aqueous solution of $Na_2CO_3$ characterized by admixing tall oil, in an amount between 50 and 600 parts of tall oil per million parts by weight of $Na_2CO_3$ prior to the reaction of the $Na_2CO_3$ with the acid to effect a marked inhibition in the formation of foam during said reaction.

2. In a continuous method of producing sodium acid orthophosphates by continuously intermixing orthophosphoric acid and an aqueous solution of soda ash in a mixing vessel in such amounts that the ratio of the orthophosphoric acid to the soda ash is at least the stoichiometric quantity required by the equations:

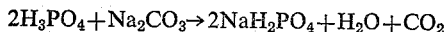
$$2H_3PO_4 + Na_2CO_3 \rightarrow 2NaH_2PO_4 + H_2O + CO_2$$

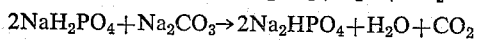
$$2NaH_2PO_4 + Na_2CO_3 \rightarrow 2Na_2HPO_4 + H_2O + CO_2$$

the improvement which consists of passing tall oil into said mixing vessel in an amount sufficient to provide between 10 and 800 parts by weight per million parts of the soda ash to effect a marked inhibition in the formation of foam during the reactions represented by said equations.

References Cited in the file of this patent

UNITED STATES PATENTS

| | | |
|---|---|---|
| 2,698,219 | Martin | Dec. 28, 1954 |
| 2,747,964 | Bacon et al. | May 29, 1956 |
| 2,753,309 | Figdor | July 31, 1956 |

OTHER REFERENCES

Industrial and Engineering Chemistry, Defoamers, Morse et al., vol. 44, No. 2, February 1952, pages 346–348.